July 10, 1934.                    C. LITTLEFIELD                    1,966,180
                        COMBINED WRAPPING AND SLICING MACHINE
                              Filed Nov. 9, 1929            4 Sheets-Sheet 1

July 10, 1934.  C. LITTLEFIELD  1,966,180
COMBINED WRAPPING AND SLICING MACHINE
Filed Nov. 9, 1929  4 Sheets-Sheet 2

INVENTOR
Carl Littlefield
BY Chappell & Earl
ATTORNEYS

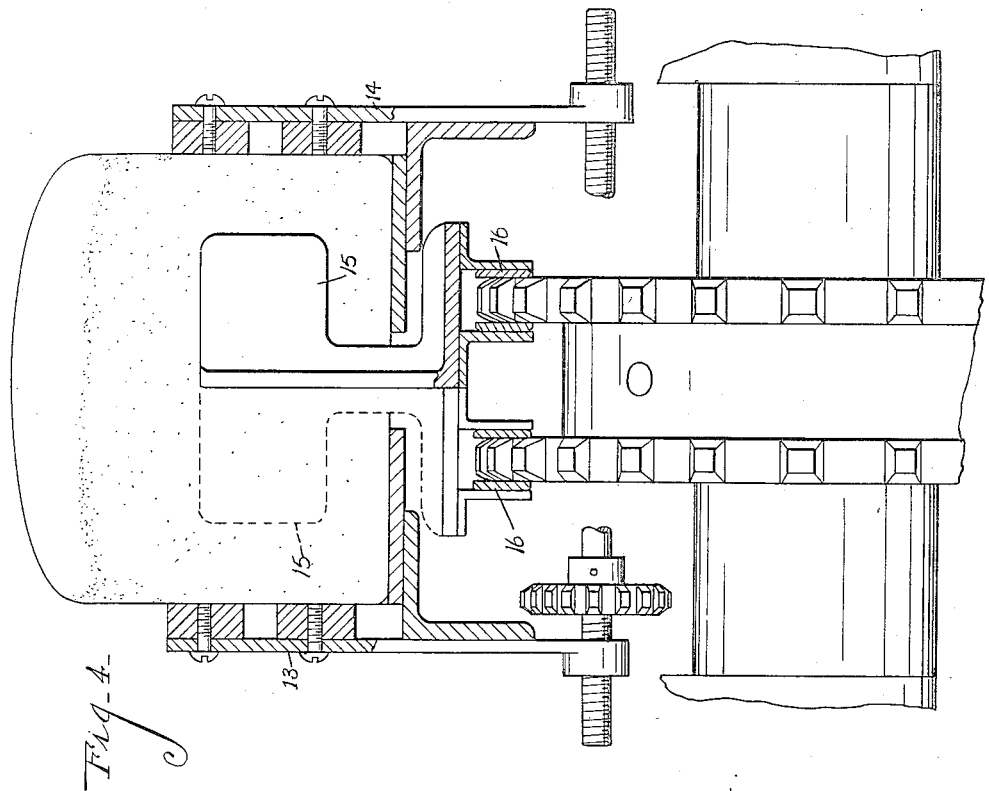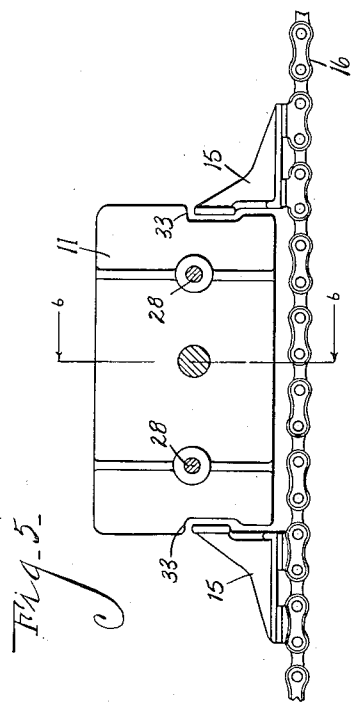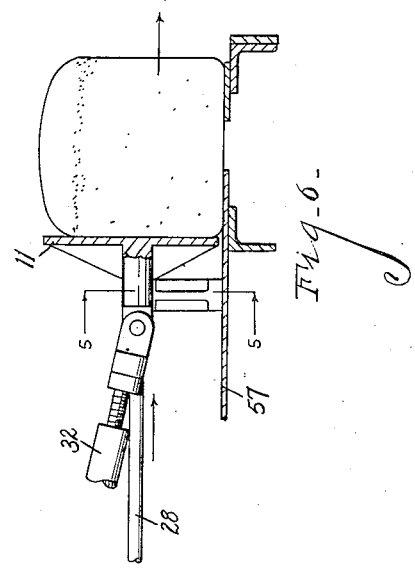

Patented July 10, 1934

1,966,180

UNITED STATES PATENT OFFICE 1,966,180

COMBINED WRAPPING AND SLICING MACHINE

Carl Littlefield, Battle Creek, Mich., assignor to Battle Creek Bread Wrapping Machine Company, Battle Creek, Mich.

Application November 9, 1929, Serial No. 405,934

23 Claims. (Cl. 93—2)

The main objects of this invention are:

First, to provide a combined slicing and wrapping machine by means of which bread or the like may be delivered to the slicing end of the machine, the sliced loaf delivered as a unit to and carried through the several wrapping operations as a unit.

Second, to provide a wrapping machine adapted to handle sliced loaves of bread or the like without displacing or crushing the same and to effectively wrap and seal.

Third, to provide a machine for slicing and wrapping bread and the like which requires a comparatively small amount of manual labor.

Fourth, to provide a machine of the class described which is of large capacity and at the same time simple and compact in structure.

Objects pertaining to details and economies of my invention will definitely appear from the description to follow. The invention is defined in the claims.

A structure which is a preferred embodiment of my invention is clearly illustrated in the accompanying drawings in which:

Fig. 4 is an enlarged detail view partially in section on line 4—4 of Fig. 2 showing details of the feed conveyor.

Fig. 5 is an enlarged detail view of the transfer feed plunger on a line corresponding to line 5—5 of Figs. 3 and 6.

Fig. 6 is a fragmentary view on a line corresponding to line 6—6 of Fig. 5.

Fig. 7 is a detail sectional view on line 7—7 of Fig. 3.

Figure 1:
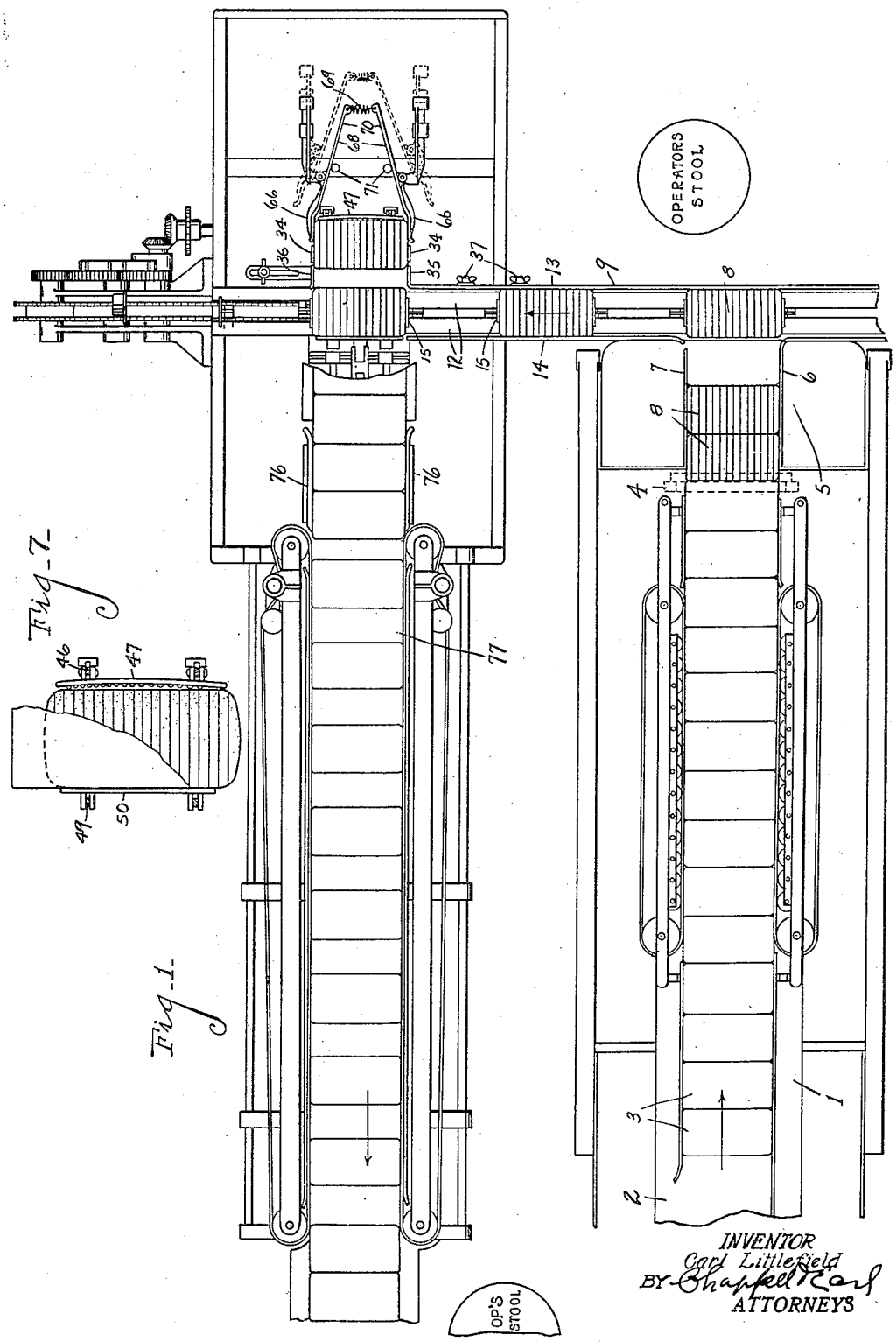
Fig. 1 is a fragmentary view of my improved combined slicing and wrapping machine, various parts being omitted to better show the relation and general arrangement of other parts, and certain parts being shown in conventional form.

The embodiment of my improvements illustrated in the accompanying drawings comprises a slicing unit designated generally by the numeral 1 and consisting of a feed conveyor 2 by means of which articles, such as loaves of bread indicated at 3, are fed through the machine in a continuous stream or in juxtaposed position. The slicing means is indicated at 4.

The loaves are fed to this slicing means and discharged therefrom on to a receiving table 5 by means of the feed conveyor which pushes the loaves through the slicing means and on to the feed conveyor between the guide members 6 and 7. The sliced loaves are indicated at 8. These sliced loaves are fed as units into the wrapping machine and carried through the several folding mechanisms and delivered as a single wrapped unit.

The slicing machine illustrated is that of my copending application for patent filed September 30, 1929, Serial No. 396,033, although I may employ in this relation the slicing machine or mechanism shown in my application for Letters Patent filed September 19, 1929, Serial No. 393,339.

The wrapping machine feed means comprises a feed conveyor designated generally by the numeral 9, a vertically reciprocating feed plunger 10 disposed to reciprocate at the side of the feed conveyor and a transfer plunger 11 adapted to transfer the articles from the feed conveyor to the feed plunger. The feed plunger delivers the articles to the wrapping mechanism.

Figure 2:
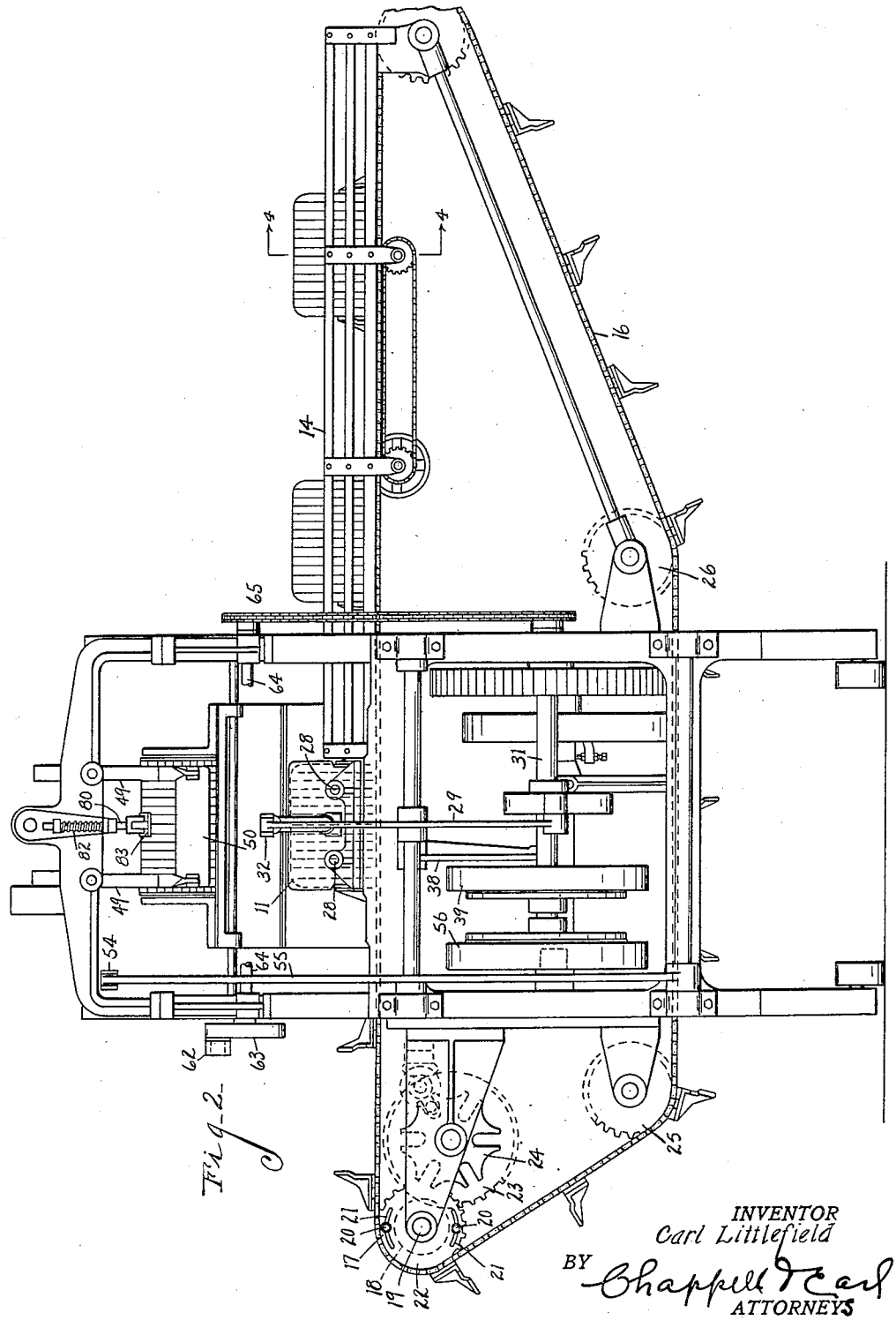
Fig. 2 is a fragmentary elevation looking from the right of Fig. 1.

The feed conveyor comprises a pair of ways 12 having side bars 13 and 14 mounted at the sides thereof and between which the articles are carried as indicated in Fig. 2. The way members 12 are spaced to receive the flights 15 which are arranged in coacting pairs constituting holders engaging the ends of the sliced loaf. These flights are mounted on a pair of sprocket chains 16, the flights carried by one chain facing in one direction and the flights carried by the other chain facing in the opposite direction. The flights of the two chains are alternated.

The sprockets 17 for these chains are adjustably mounted on a drum-like hub 18 pinned to the journal 19 so that by rotating the sprockets on their hub the coacting pairs of flights may be adjusted to and from each other, thereby adapting them to the particular length of loaf or article to be handled. The sprockets are adjustably secured to the hub by means of the screws 20 engaging segmental slots 21 in the sprockets.

By this means the holder flights may be quickly adjusted to support the loaf without undue compression thereon.

The conveyor chains are driven by the driven sprocket wheel 22 through a train of gears indicated at 23, Fig. 2, which includes a Geneva gear 24, so that the feed conveyor delivers the articles with a step by step movement. The conveyor chains are further supported by the guide sprockets 25 and 26.

The feed conveyor delivers the articles in a position to be engaged by the transfer plunger 11 which is reciprocatingly mounted on the slide rods 28, the plunger being reciprocated by means of the lever 29 actuated by the cam 30 on the main driving shaft 31. The upper end of this lever is connected by the link or pitman 32 to the transfer plunger. The parts are thus synchronized so that the transfer plunger is actuated while the feed conveyor is at rest. It is also actuated while the feed or elevating plunger 10 is at rest in its initial position.

The transfer plunger 11 is recessed at its ends as at 33 to receive the flights 15 so that the end slices of the loaf are effectively engaged by the plunger.

The elevating or feed plunger 10 is provided with holders 34 between which the loaf is delivered by the transfer plunger. The conveyor side member 13 has laterally turned guide 35 at its end and an adjustable guide 36 arranged in opposed relation to guide the articles to the feed plunger. The member 13 is mounted for longitudinal adjustment by means of the bolts and thumb nuts indicated at 37 so that both guide members to the feed plunger may be adjusted. This is necessary for properly centering the article on the feed plunger.

The feed plunger 10 is actuated by means of the lever 38 and coacting cam 39, the lever being connected to the plunger rod 40 by means of the link 41.

The paper indicated by dotted lines at 42 is fed across the path of the feed plunger by means of a paper feed mechanism designated generally by the numeral 43. As this paper feed mechanism forms no part of my present invention, it is not illustrated herein, it being sufficient to say that the sheets of paper of suitable dimensions are delivered across the path of the article, as it is lifted by the feed plunger, and draped over the top and sides thereof.

The feed plunger delivers the articles to be wrapped to a folder carriage, that is, a carriage for carrying the articles through the folding mechanism and supporting them while the folding operations are being performed thereon.

Figure 3:
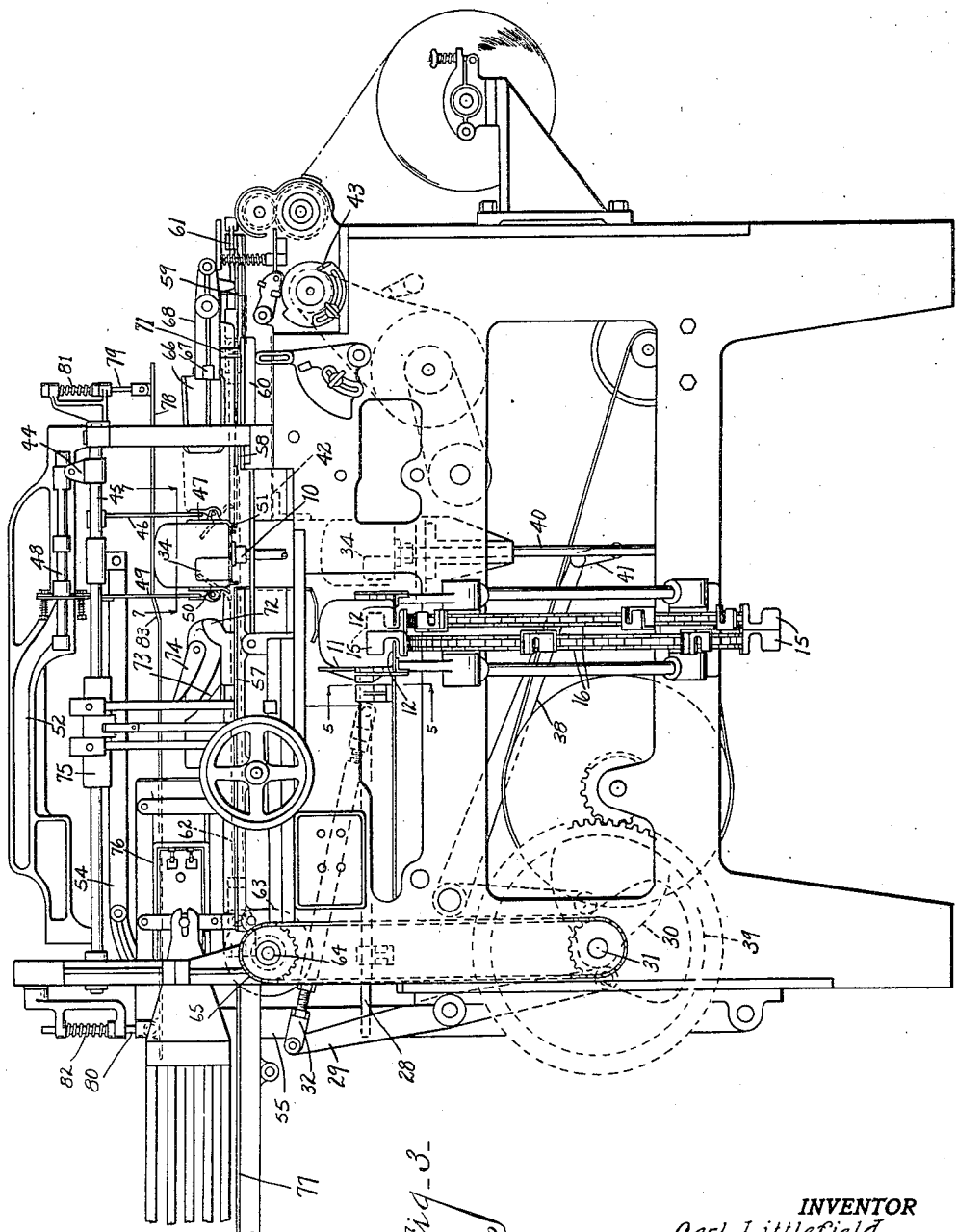
Fig. 3 is a fragmentary side elevation looking from the right of Fig. 2.

The feed carriage is designated generally by the numeral 44 and is reciprocatingly mounted on the slide rods 45. This carriage is provided with a depending arm 46 carrying a gripper 47 and a swinging arm 48 carrying a depending arm 49 having a gripper 50 coacting with the gripper 47. These grippers are pivotally mounted on their arms with the pivots arranged so that the grippers swing by gravity to the inclined positions indicated by dotted lines in Fig. 3, so that, as the article to be wrapped is carried between them, they whip the wrapper against the sides of the loaf and swing to loaf clamping position shown by full lines in Fig. 3.

The gripper 47 preferably has a slight longitudinal curvature and has a forwardly projecting flange 51 on its lower edge which swings under the article to be wrapped as shown in Fig. 2, supporting it when the plunger is withdrawn and also giving an initial turn to the front bottom flap.

The arm 48 is lifted by the cam 52 as the carriage reaches the end of its travel so that the gripper 50 is lifted above the loaf on the rearward movement of the carriage.

The carriage is connected by the link 54 to the lever 55 actuated by the cam 56 on the cam shaft 31.

The articles are carried by this folder carriage on to the folding and sealing way 57. The front bottom folder 58 is mounted on a carriage 59 reciprocatingly mounted in the slide way 60. This bottom folder is shown in partially projected position by dotted lines in Fig. 3, which is the position it occupies when the feed plunger starts on its return movement.

As soon as the feed plunger is sufficiently cleared the bottom flap folder is projected forwardly to fold the front bottom flap and serve as an article support.

The carriage 59 is actuated by the lever 61 which is turn actuated by the link or pitman 62 on the crank disk 63 which is mounted on the shaft 64 connected by the sprocket chain 65 to the cam shaft 31. This folder carriage 59 also carries a pair of front end flap folders and feed members 66 which are pivoted at 67 on the brackets 68 on the slide or carriage 59. These folder members 66 are urged apart by means of the spring 69 connecting their rearwardly projecting arms 70. As the folder carriage moves forwardly these arms engage with the tappets 71 on a fixed part of the frame, swinging the folder member into clamping engagement with the ends of the loaf and folding the front end flaps thereon.

It will be noted that the holders 34 of the feed plunger are positioned so that the folder members may engage before the plunger is retracted. These folder members assist in supporting the loaf.

The main folder carriage is then actuated to carry the articles on to the main folder way 57 which folds the rear bottom flap. As the article is moved along the way 57 the rear flaps are engaged by the first rear flap folders 72 and continued movement brings the bottom flap into engagement with the flap folder 73 and the top flap into coacting relation with the creasing finger 74. The top end flap folder 75 is then actuated to fold the top flap downwardly just prior to the articles passing between the end sealing plates 76.

The articles are discharged from the sealing plates to the delivery conveyor designated generally by the numeral 77. As the details of this delivery conveyor form no part of this invention they are not further described.

As the article with the wrapper draped thereon is delivered into first folding position by the feed conveyor 10 it is brought into contact with the retaining bar 78 which is supported at its ends by the vertically reciprocating rods 79 and 80 having thrust springs 81 and 82 thereon. This bar serves to hold the wrapper during the initial folding movement and also to hold the article down upon the folder and conveyor way during the several operations as it is carried along thereon. The bar is provided with an offset 83 so that the pressure on the article is increased as the article is delivered on to the conveyor way.

It will be observed that the sliced loaves are delivered as a unit throughout the several operations and that they are supported by end gripping members throughout; first, by the coacting pairs of feed conveyor flights or holders and during the transfer to the feed plunger gripping members 34 by the members 35 and 36. The loaf is then engaged by the folder carriage grippers and the front end flap folder members, and finally is carried by the fixed folder members at the sides of the conveyor way so that the article is completely wrapped without undue pressure and without any distortion or displacement of the slices.

My improved wrapping machine enables the wrapping of sliced loaves of bread without the aid of trays or preliminary holders such as bands, skewers or the like.

I have illustrated and described my improvements in an embodiment which has proved very satisfactory and efficient. I have not attempted to illustrate and describe certain other embodiments and adaptations as it is believed that this disclosure will enable those skilled in the art to embody or adapt my improvements as may be desired.

Having thus described my invention what I claim as new and desire to secure by Letters Patent is:

1. In an apparatus of the class described, the combination of a feed conveyor driven with a step by step movement and provided with a plurality of holders adapted to receive a sliced loaf, a feed plunger disposed at the side of said feed conveyor and having holders disposed adjacent one side thereof, a transfer plunger acting to transfer the sliced loaf as a unit from said feed conveyor to said plunger holders, a wrapping and sealing conveyor way, a reciprocating carriage provided with pivoted grippers to which the loaf is delivered by said feed plunger, a reciprocating folder slide, a front bottom flap folder mounted on said slide, front end flap folders pivotally mounted on said slide to close upon the ends of the loaf at the sides of said holders on said feed plunger, a spring acting to normally open said front end flap folders, tappets with which said front end flap folders engage on the work stroke of the folder slide, relatively fixed rear end flap and bottom flap folders disposed at the sides of the folder way and between which the loaf is carried by said folder carriage, a top end flap folder, and sealing plates disposed at the rear of said flap folders and between which the wrapped loaf is delivered by said folder carriage.

2. In an apparatus of the class described, the combination of a feed conveyor driven with a step by step movement and provided with a plurality of holders adapted to receive a sliced loaf, a feed plunger disposed at the side of said feed conveyor and having holders, a transfer plunger acting to transfer the sliced loaf as a unit from said feed conveyor to said plunger holders, a wrapping and sealing conveyor way, a reciprocating carriage provided with pivoted grippers to which the loaf is delivered by said feed plunger, a reciprocating folder slide, a front bottom flap folder mounted on said slide front end flap folders mounted on said slide to close upon the ends of the loaf at the sides of said holders on said feed plunger, relatively fixed rear end flap and bottom flap folders disposed at the sides of the folder way and between which the loaf is carried by said folder carriage, a top end flap folder, and sealing plates disposed at the rear of said flap folders and between which the wrapped loaf is delivered by said folder carriage.

3. In an apparatus of the class described, the combination of a feed conveyor driven with a step by step movement and provided with a plurality of holders adapted to receive a sliced loaf, a feed plunger disposed at the side of said feed conveyor and having holders, a transfer plunger acting to transfer the sliced loaf as a unit from said feed conveyor to said plunger holders, a wrapping and sealing conveyor way, a reciprocating carriage provided with pivoted grippers to which the loaf is delivered by said feed plunger, the front gripper being longitudinally curved and having a flange on its lower edge adapted to engage the under side of the loaf and initially fold the front bottom flap of the wrapper, a reciprocating folder slide, a front bottom flap folder mounted on said slide, front end flap folders mounted on said slide to close upon the ends of the loaf at the sides of said holders on said feed plunger, relatively fixed rear end flap and bottom flap folders disposed at the sides of the folder way and between which the loaf is carried by said folder carriage, a top end flap folder, and sealing plates disposed at the rear of said flap folders and between which the wrapped loaf is delivered by said folder carriage.

4. In an apparatus of the class described, the combination of a feed conveyor driven with a step by step movement and provided with a plurality of holders adapted to receive a sliced loaf, a feed plunger disposed at the side of said feed conveyor and having holders disposed adjacent one side thereof, a transfer plunger acting to transfer the sliced loaf as a unit from said feed conveyor to said plunger holders, a wrapping and sealing conveyor way, a reciprocating carriage provided with pivoted grippers to which the loaf is delivered by said feed plunger, a reciprocating folder slide, a front bottom flap folder mounted on said slide, front end flap folders pivotally mounted on said slide to close upon the ends of the loaf at the sides of said holders on said feed plunger, a spring acting to normally open said front end flap folders, and tappets with which said front end flap folders engage on the work stroke of the folder slide.

5. In an apparatus of the class described, the combination of a feed conveyor driven with a step by step movement and provided with a plurality of holders adapted to receive a sliced loaf, a feed plunger disposed at the side of said feed conveyor and having holders, a transfer plunger acting to transfer the sliced loaf as a unit from said feed conveyor to said plunger holders, a wrapping and sealing conveyor way, a reciprocating carriage provided with pivoted grippers to which the loaf is delivered by said feed plunger, a reciprocating folder slide, a front bottom flap folder mounted on said slide, front end flap folders mounted on said slide to close upon the ends of the loaf at the sides of said holders on said feed plunger, and tappets with which said front end flap folders engage on the work stroke of the folder slide.

6. In an apparatus of the class described, the combination of a feed conveyor driven with a step by step movement and provided with a plurality of holders adapted to receive a sliced loaf, a feed plunger disposed at the side of said feed conveyor and having holders, a transfer plunger acting to transfer the sliced loaf as a unit from said feed conveyor to said plunger holders, a wrapping and sealing conveyor way, a reciprocating carriage provided with pivoted grippers to which the loaf is delivered by said feed plunger, the front gripper being longitudinally curved and having a flange on its lower edge adapted to engage the under side of the loaf and initially fold the front bottom flap of the wrapper, a reciprocating folder slide, a front bottom flap folder mounted on said slide, front end flap folders mounted on said slide to close upon the ends of the loaf at the sides of said holders on said feed plunger, and tappets with which said front end flap folders engage on the work stroke of the folder slide.

7. In an apparatus of the class described, the combination of a feed plunger having holders disposed adjacent one side thereof so as to expose one side of the ends of the loaf and adapted to receive a sliced loaf, a wrapping and sealing conveyor way, a reciprocating carriage provided with depending grippers having means adapted to support a sliced loaf and to which the sliced loaf is delivered from below by said feed plunger, a reciprocating folder slide, a front bottom flap folder mounted on said slide, front end flap folders mounted on said slide to close upon the exposed ends of the loaf at the sides of said holders on said feed plunger, relatively fixed rear end flap and bottom flap folders disposed at the sides of the folder way and between which the loaf is carried by said folder carriage, a top end flap folder, and sealing plates disposed at the rear of said flap folders and between which the wrapped loaf is delivered by said folder carriage.

8. In an apparatus of the class described, the combination of a feed plunger having holders disposed adjacent one side thereof so as to expose one side of the ends of the loaf and adapted to receive a sliced loaf, a wrapping and sealing conveyor way, a reciprocating carriage provided with depending grippers having means adapted to support a sliced loaf and to which the sliced loaf is delivered from below by said feed plunger, a reciprocating folder slide, a front bottom flap folder mounted on said slide, and front end flap folders mounted on said slide to close upon the exposed ends of the loaf at the sides of said holders on said feed plunger.

9. In an apparatus of the class described, the combination of a feed plunger having holders disposed adjacent one side thereof and adapted to receive a sliced loaf, a wrapping and sealing conveyor way, a reciprocating carriage provided with pivoted grippers to which the loaf is delivered by said feed plunger, the front gripper being longitudinally curved and having a flange on its lower edge adapted to engage the under side of the loaf and initially fold the front bottom flap of the wrapper, a reciprocating folder slide, a front bottom flap folder mounted on said slide, and front end flap folders mounted on said slide to close upon the ends of the loaf at the sides of said holders on said feed plunger.

10. In an apparatus of the class described, the combination of a feed conveyor delivering with a step by step movement and provided with a plurality of holders adapted to receive a sliced loaf as a unit, a feed plunger disposed at the side of said conveyor and having holders adapted to receive the sliced loaf as a unit, a transfer plunger acting to transfer the sliced loaf as a unit from said feed conveyor to said plunger holders, a wrapping conveyor way, a folder conveyor provided with grippers to which the sliced loaf is delivered as a unit by said feed plunger, the front gripper being longitudinally curved and provided with a flange on its lower edge adapted to engage on the under side of the loaf and initially fold the front bottom flap of the wrapper, a reciprocating front bottom flap folder, front end flap folders mounted to close upon the ends of the loaf while supported by said grippers, and end flap folders disposed at the sides of the conveyor way to support the ends of the sliced loaf and complete the folding operations as the loaf is translated along said way by said folder conveyor.

11. In an apparatus of the class described, the combination of a feed conveyor delivering with a step by step movement and provided with a plurality of holders adapted to receive and support a sliced loaf as a unit, a feed plunger disposed at the side of said conveyor and having holders adapted to receive and support the sliced loaf as a unit, a transfer plunger acting to transfer the sliced loaf as a unit from said feed conveyor to said plunger holders, a wrapping conveyor way, a folder conveyor adapted to support a sliced loaf and to which the sliced loaf is delivered as a unit from below by said feed plunger, a reciprocating front bottom flap folder, front end flap folders mounted to close upon the ends of the loaf while supported by said conveyor, and end flap folders disposed at the sides of the conveyor way to support the ends of the sliced loaf and complete the folding operations as the loaf is translated along said way by said folder conveyor.

12. In an apparatus of the class described, the combination of a folder carriage provided with grippers adapted to receive a sliced loaf of bread as a unit, the front gripper having a flange on its lower edge adapted to engage under the bottom of the loaf, a reciprocating front bottom flap folder, front end flap folders mounted for pivotal and reciprocating movement, means for actuating said front end flap folders to close the same upon the ends of the loaf while supported by said feed means, end flap folders disposed at the sides of the path of said folder carriage to complete the wrapper folding operations and support the ends of the sliced loaf, and end sealing plates between which the wrapped loaves are delivered by said folder carriage.

13. In an apparatus of the class described, the combination of a folder carriage provided with depending grippers adapted to receive a sliced loaf of bread and provided with means to support the same as a unit, a reciprocating front bottom flap folder, front end flap folders, means for actuating said front end flap folders to engage the ends of the loaf while supported by said feed means, said end flap folders holding the slices together and assisting in supporting said loaf, end flap folders disposed at the sides of the path of said folder carriage to complete the wrapper folding operations and support the ends of the sliced loaf, and end sealing plates between which the wrapped loaves are delivered by said folder carriage.

14. In an apparatus of the class described, the combination of a feed conveyor delivering with a step by step movement and provided with a plurality of holders adapted to receive and support a sliced loaf as a unit, a feed plunger disposed at the side of said conveyor and having holders adapted to receive and hold the sliced loaf as a unit, a transfer plunger acting to transfer the sliced loaf as a unit from said feed conveyor to said plunger holders, a folder conveyor to which the sliced loaves are delivered as a unit by said feed plunger, wrapper folding means operatively associated with said wrapper conveyor and coacting therewith to hold the sliced loaf in assembled relation during the wrapper folding operations, and a sealing means to which the wrapped sliced loaf is delivered from said wrapping conveyor having supporting engagement with the ends of the wrapped sliced loaf.

15. In an apparatus of the class described, the combination of a folder carriage adapted to receive a sliced loaf of bread as a unit, a feed means adapted to deliver sliced loaves from below to said folder carriage, a wrapper feed means adapted to deliver wrappers across the path of said loaf feed means whereby the wrappers are draped over the sliced loaves of bread as they are delivered to said folder carriage, said folder carriage being adapted to receive the sliced loaves with the wrapper draped over the same and being provided with longitudinal bottom edge engaging means to support each loaf during the initial folding operations, a series of flap folders operatively associated with said folder carriage and acting to support the sliced loaf from its ends, and a sealing means to which the wrapped loaf is delivered from said folding means and acting to support the ends of the sliced wrapped loaf.

16. In an apparatus of the class described, the combination of a folder carriage adapted to receive a sliced loaf of bread as a unit, a feed means adapted to deliver sliced loaves from below to said folder carriage, a wrapper feed means adapted to deliver wrappers across the path of said loaf feed means whereby the wrappers are draped over the the sliced loaves of bread as they are delivered to said folder carriage, said folder carriage being adapted to receive the sliced loaves with the wrapper draped over the same and being provided with longitudinal bottom edge engaging means to support each loaf during the initial folding operations, and a series a flap folders operatively associated with said folder carriage and acting to support the sliced loaf from its ends.

17. In an apparatus of the class described, the combination of a folder carriage provided with depending grippers adapted to engage the sides of a sliced loaf of bread as a unit, one of said grippers having longitudinal loaf-bottom edge engaging means for supporting and keeping the slices in alinement and a reciprocating feed plunger delivering from below to said gripper members and provided with end members adapted to engage the ends of a sliced loaf.

18. In an apparatus of the class described, the combination of means adapted to deliver sliced loaves as assembled units, a feed conveyor provided with longitudinally spaced holders adapted to receive and support the ends of the sliced loaves as units and move them in line with their longitudinal axes, means adapted to receive the sliced loaves as units, means acting to transfer the sliced loaves as units from said feed conveyor to said receiving means, and wrapping means to which the sliced loaves are delivered by said receiving means as units and adapted to wrap the same as units.

19. In an apparatus of the class described, the combination of a feed conveyor provided with a plurality of holders adapted to receive an article to be wrapped, a feed plunger disposed at the side of said feed conveyor and having holders disposed adjacent one side thereof, a transfer plunger acting to transfer the article as a unit from said feed conveyor to said plunger holders, a wrapping and sealing conveyor way, a reciprocating carriage provided with pivoted grippers to which the article is delivered by said feed plunger, a reciprocating folder slide, a front bottom flap folder mounted on said slide, front end flap folders pivotally mounted on said slide to close upon the ends of the article at the sides of said holders on said feed plunger, a spring acting to normally open said front end flap folders, tappets with which said front end flap folders engage on the work stroke of the folder slide, relatively fixed rear end flap and bottom flap folders disposed at the sides of the folder way and between which the article is carried by said folder carriage, a top end flap folder, and sealing plates disposed at the rear of said flap folders and between which the wrapped article is delivered by said folder carriage.

20. In an apparatus of the class described, the combination of a feed conveyor provided with a plurality of holders adapted to receive an article to be wrapped, a feed plunger disposed at the side of said feed conveyor and having holders, a transfer plunger acting to transfer the article as a unit from said feed conveyor to said plunger holders, a wrapping and sealing conveyor way, a reciprocating carriage provided with pivoted grippers to which the article is delivered by said feed plunger, a reciprocating folder slide, a front bottom flap folder mounted on said slide, front end flap folders mounted on said slide to close upon the ends of the article at the sides of said holders on said feed plunger, and tappets with which said front end flap folders engage on the work stroke of the folder slide.

21. In an apparatus of the class described, the combination of a feed plunger having holders disposed adjacent one side thereof and adapted to receive an article to be wrapped, a wrapping and sealing conveyor way, a reciprocating carriage provided with pivoted grippers to which the article is delivered by said feed plunger, the front gripper being longitudinally and outwardly curved and having a flange on its lower edge adapted to engage the under side of the article and initially fold the front bottom flap of the wrapper, a reciprocating folder slide, a front bottom flap folder mounted on said slide, and front end flap folders mounted on said slide to close upon the ends of the article at the sides of said holders on said feed plunger.

22. In an apparatus of the class described, the combination of a folder carriage provided with grippers adapted to receive an article to be wrapped as a unit, the front gripper having a flange on its lower edge adapted to engage under the bottom of the article, a reciprocating front bottom flap, folder, front end flap folders mounted for pivotal and reciprocating movement, means for actuating said front end flap folders to close the same upon the ends of the article while supported by said feed means, end flap folders disposed at the sides of the path of said folder carriage to complete the wrapper folding operations and support the ends of the article, and end sealing plates between which the wraped articles are delivered by said folder carriage.

23. In a machine of the class described, the combination of a folder carriage provided with opposed side grippers one of which has an inturned flange at its lower edge, a feed plunger for delivering to said folder carriage and having upright rear-half end members for engaging the ends of the article at its rear half while exposing the ends of the article at its front half, and front end flap folders for engaging the ends of the article at its front half prior to the retraction of said feed plunger.

CARL LITTLEFIELD.